March 15, 1960     T. H. HAIRSTON     2,928,118
FISH SCALER
Filed Sept. 26, 1958
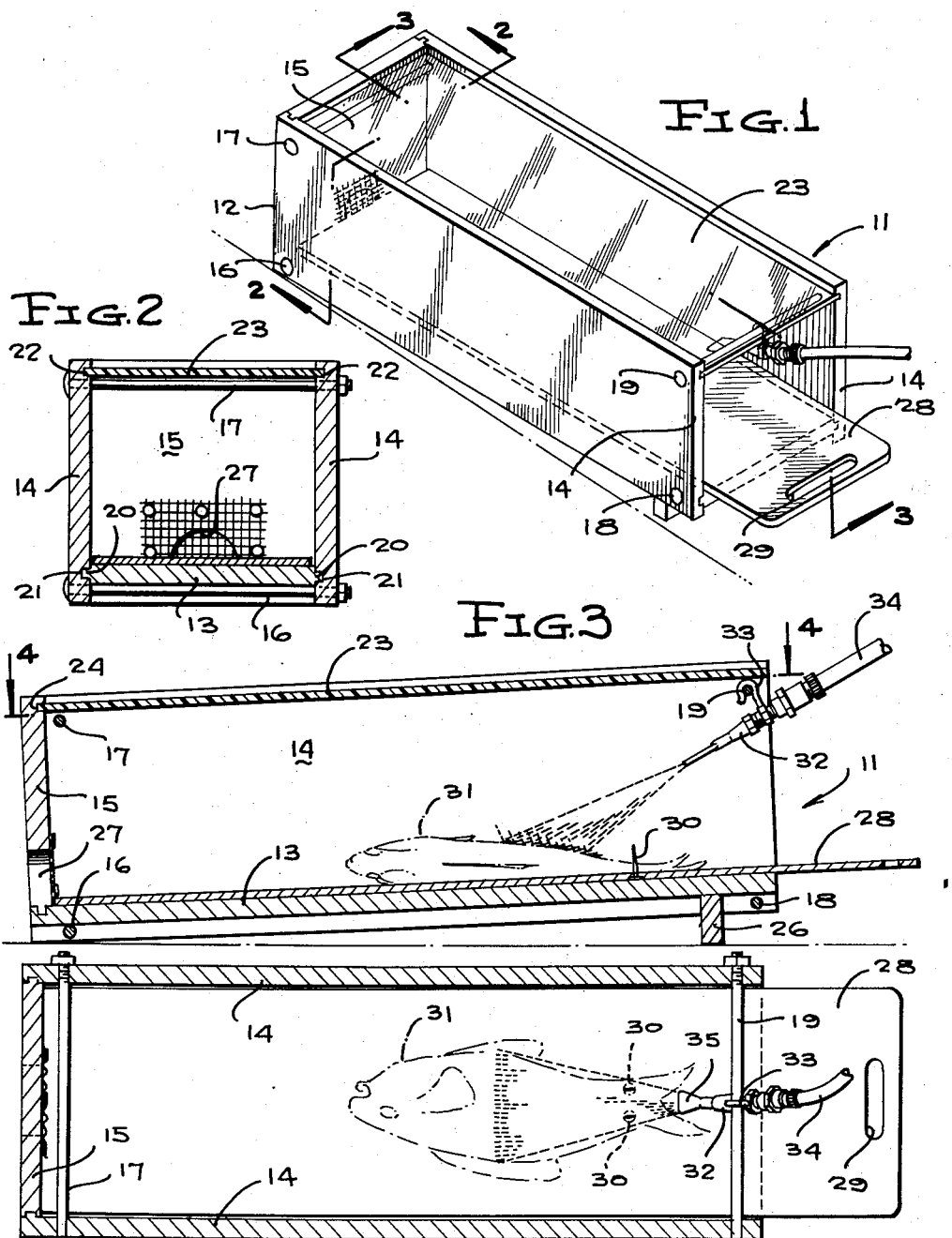
INVENTOR.
TERRY H. HAIRSTON
BY
*McMorrow, Berman & Davidson*
ATTORNEYS

United States Patent Office 2,928,118
Patented Mar. 15, 1960

2,928,118

FISH SCALER

Terry H. Hairston, Columbus, Miss.

Application September 26, 1958, Serial No. 763,544

2 Claims. (Cl. 17—5)

This invention relates to devices for scaling fish, and more particularly to a fish scaler of the hydraulic type employing the kinetic energy in a jet of water to dislodge the scales from a fish.

A main object of the invention is to provide a novel and improved hydraulic fish scaler which is simple in construction, which is easy to use, and which enables the scales to be removed from a fish quickly and efficiently.

A further object of the invention is to provide an improved hydraulic fish scaler which is inexpensive to fabricate, which is durable in construction, and which enables the scales to be removed from a fish in a clean and efficient manner without requiring the use of knives or other scraping implements.

Further objects and advantages of the invention will become apparent from the following description and claims, and from the accompanying drawings, wherein:

Figure 1 is a perspective view of a hydraulic fish scaler constructed in accordance with the present invention.

Figure 2 is an enlarged transverse vertical cross sectional view taken on the line 2—2 of Figure 1.

Figure 3 is an enlarged longitudinal vertical cross sectional view taken on the line 3—3 of Figure 1.

Figure 4 is a horizontal cross sectional view taken on the line 4—4 of Figure 3.

Referring to the drawings, the improved fish scaling implement is designated generally at 11 and comprises an elongated box 12 having a bottom wall 13, side walls 14, 14, and a transverse end wall 15, the opposite end of the box being open. The box is fastened in assembled condition by respective transverse bolts 16, 17, 18 and 19 extending through and connecting the respective corner portions of the opposing side walls 14, 14, the bottom wall 13 being formed with tongue elements 20, 20 at its longitudinal edges which are received in grooves 21, 21 formed in the inside surfaces of the lower portions of the side walls 14, 14. The top marginal portions of side walls 14, 14 are formed with similar grooves 22, 22 which receive the side edges of a transparent top panel member 23 which serves as a top wall for the box. The forward end wall 15 is likewise formed at its top marginal portion with a transversely extending groove 24 which receives the forward edge of the transparent top panel 23.

As shown in Figure 3, the transversely extending fastening bolts 16 and 18 are located beneath the bottom wall 13, whereas the transversely extending fastening bolts 17 and 19 are located beneath the transparent top wall member 23, the rear bolt 19 being located adjacent the open rear end of the box 12.

A transversely extending supporting block 26 is secured beneath the bottom wall 13 a short distance forwardly of the transverse bolt 18, as shown in Figure 3, the block 26 serving as a support to hold the box on a horizontal surface at a slight incline. Front wall 15 is formed with a drainage aperture 27 allowing water to discharge from the forward end portion of the box during use of the implement.

A screen 27' is secured to the inside surface of front wall 15 to retain the scales loosened by the water, whereby the loosened scales are collected in the box and may be removed therefrom for disposal after a substantial quantity thereof has been collected.

Designated at 28 is a longitudinal board which slidably fits inside the box 12 and which substantially engages the inner surfaces of the side walls 14, 14 at its respective side edges. The board 28 is somewhat longer than the box 12, so that when the board is fully inserted in the box, its rear portion projects a substantial distance from the open rear end of the box. Said rear portion is formed with a transversely extending slot 29, defining a handle grip for the board 28, whereby the board may be easily and rapidly withdrawn from the box, whenever required.

Secured to the board 28 and projecting upwardly therefrom at its rear portion are a pair of spaced spike members 30, 30 on which a portion of a fish 31 to be scaled may be impaled in the manner illustrated in Figures 3 and 4, to hold the fish on the board 28. Thus, the tail portion of the fish 31 may be engaged on the holding spikes 30, 30, whereby the fish will be held in a longitudinally extending position on the board 28 with the scales directed toward the open rear end of box 12 when the board is placed in the box in the position thereof illustrated in Figures 3 and 4.

Designated at 32 is a nozzle member to which is secured a hook 33, said hook being dimensioned to rotatably and slidably engage on the upper rear transverse bolt 19, whereby to support the nozzle 32 in a position directed inwardly of the box 12, as illustrated in Figure 3, and whereby to allow the nozzle to be shifted laterally, as well as to be adjusted around the axis of supporting bolt 19 so as to vary the angular position of the nozzle. Nozzle 32 is connected by a flexible hose 34 to a suitable source of water under pressure.

In using the device, the fish 31 is impaled on the board 28 by engaging a rear portion thereof on the spikes 30, 30, and the board is then inserted in the box so as to assume the position thereof illustrated in Figures 3 and 4. The water under pressure is then delivered to the nozzle 32, whereby the jet emerging from the nozzle may be directed to strike the fish and to dislodge the scales from the fish. The nozzle 32 preferably is flattened horizontally in shape, being thus formed with a flat divergent discharge orifice portion 35, whereby the spray from the discharge portion is constricted in thickness although it is elongated in width. Thus, the laterally elongated jet strikes the body of the fish at an angle whereby the kinetic energy of the jet is of a substantial magnitude and is sufficient to loosen the scales and to dislodge the same from the body of the fish.

As shown in Figure 3, the nozzle 32 is directed at an acute angle to the axis of the fish and is directed toward the forward end of the fish, this angle being substantially that required to loosen and dislodge the scales from the fish's body.

While the discharge orifice portion 35 of the nozzle 32 may have any suitable shape, a preferred shape is illustrated in Figure 4, namely, a shape wherein the discharge end of the nozzle diverges forwardly, thus providing a similarly divergent discharge jet from the nozzle which strikes the body of the fish so that it simultaneously engages substantially the entire width of the fish and loosens the scales thereon. The entire body of the fish may be cleared of scales by rotating the nozzle 32 on the supporting bolt 19 so that the jet of water from the nozzle will sweep over the entire length of the fish as the nozzle is rotated.

As above explained, the nozzle may be adjusted to the proper position for performing the scaling operation on the fish by adjusting same laterally on the supporting bolt 19.

As will be readily apparent, the board 28 may be of a sufficient width to be slidably receivable in the box 12, namely, may be of a width such that the side edges are slidably engageable with the inside surfaces of the walls 14, 14. However, the width of the board 28 is not critical and said board may be of any suitable width small enough to be received inside box 12 between the side walls 14, 14 thereof.

While a specific embodiment of an improved fish scaling implement has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A fish scaling implement comprising an elongated box having a bottom wall, side walls, a front wall formed with a drainage aperture, a top wall and an open rear end, a transverse supporting rod mounted in the top portion of the box adjacent said open end, a downwardly and forwardly inclined longitudinal board slidably disposed in the bottom of the box and extending through said open rear end, an upstanding spike element on said board for impaling a fish to be scaled thereon, a flattened, forwardly flaring nozzle, a hook member secured to said nozzle and slidably and pivotally engaging on said transverse supporting rod, whereby said nozzle may be adjustably directed downwardly and inwardly in said box, and means to connect said nozzle to a supply of water under pressure.

2. A fish scaling implement comprising an elongated box having a bottom wall, parallel, vertical side walls, an apertured front wall, a top wall and an open rear end, a transverse supporting rod mounted in the top portion of the box adjacent said open end, a downwardly and forwardly inclined longitudinal board disposed in the bottom of the box, said side walls being formed with downwardly and forwardly inclined grooves slidably receiving the side edges of said board, said board extending through said open rear end, an upstanding spike element on said board for impaling a fish to be scaled thereon, a flattened, forwardly flaring nozzle, a hook member secured to said nozzle and slidably and pivotally engaging on said transverse supporting rod, whereby said nozzle may be adjustably directed downwardly and inwardly in said box, and means to connect said nozzle to a supply of water under pressure.

References Cited in the file of this patent

UNITED STATES PATENTS 2,172,471    Grow _____ Sept. 12, 1939